(No Model.)
W. T. ARMSTRONG.
CHEESE MAKING APPARATUS.
No. 494,973. Patented Apr. 4, 1893.
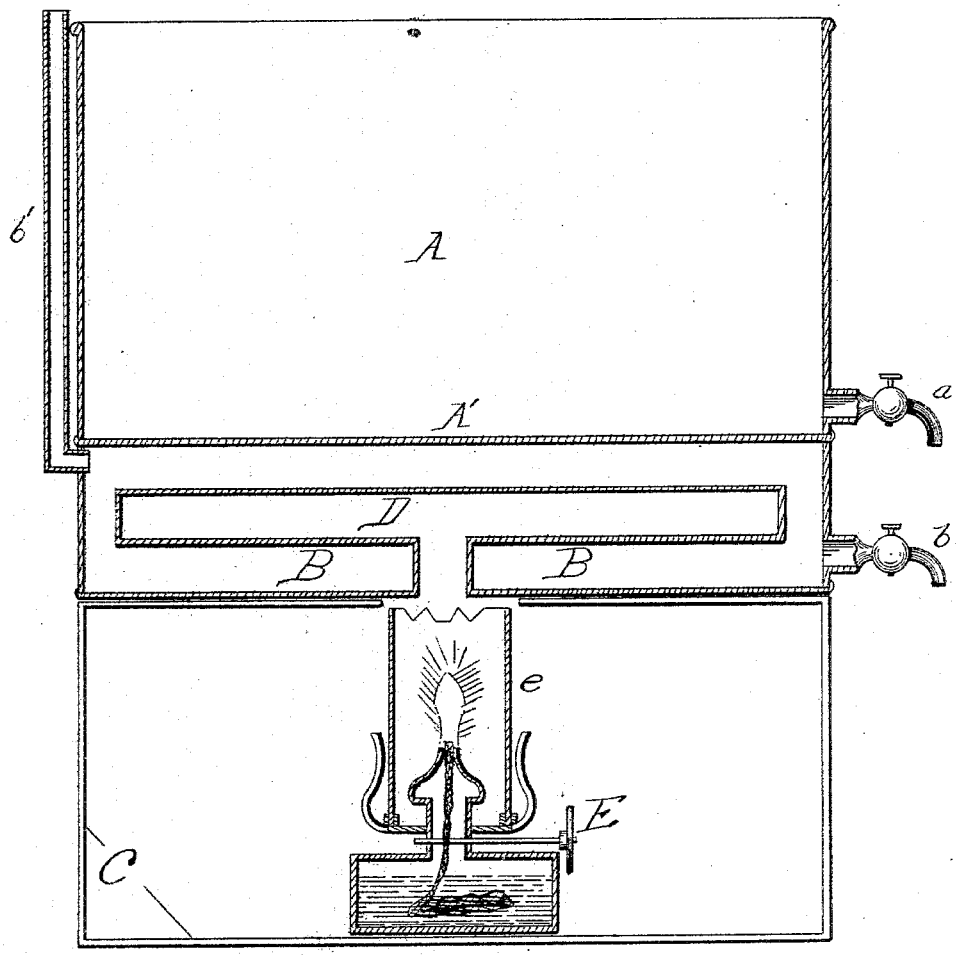

UNITED STATES PATENT OFFICE.

WILLIAM T. ARMSTRONG, OF LERDO, CALIFORNIA.

CHEESE-MAKING APPARATUS.

SPECIFICATION forming part of Letters Patent No. 494,973, dated April 4, 1893.

Application filed August 12, 1892. Serial No. 442,928. (No model.)

*To all whom it may concern:*

Be it known that I, WILLIAM T. ARMSTRONG, a citizen of the United States, residing at Lerdo, Kern county, State of California, have invented an Improvement in Cheese-Making Apparatus; and I hereby declare the following to be a full, clear, and exact description of the same.

My invention relates to that class of cheese vats in which the chamber for the milk has underlying it a compartment for the water to which heat from a suitable source is imparted.

My invention consists, in connection with the milk chamber and underlying water compartment, of a novel heater for heating the water in said compartment.

The main object of my invention is to provide a simple, and effective apparatus or vat which may be used on as small a scale, as may be desired, thus providing for its application to the uses and necessities of private families.

The particular object of my invention is to provide the most simple means of heating the water, involving in its operation and use the greatest economy by reason of the conservation of all the heat, and permitting the temperature to be regulated with accuracy, thus placing within the hands of every one, skilled or unskilled, the means of making cheese at all times and in any quantities required.

Referring to the accompanying drawing for a more complete explanation of my invention,—the figure is a vertical section of my apparatus.

A is the chamber for the milk, and B is the underlying compartment for the water. These may be made in separate vessels, or preferably, as here shown, may be included in one casing separated by a suitable partition A, said casing resting upon a suitable stand or foundation C.

*a* is a drain pipe for drawing off the whey from the curd in the milk chamber.

*b* is the drain pipe from the water compartment, and *b'* is the feed water pipe for said compartment, the said pipe *b'* being exterior of the vessels and having its lower end entering the water chamber.

D is a horizontally disposed T-shaped pipe which constitutes the heater. This pipe is wholly within the water compartment B, being sustained by its vertical portion or leg which is secured in and opens through the bottom of the compartment about its middle, while the horizontal portions or arms extend horizontally within the compartment B about midway between its top and bottom and about in the vertical central plane thereof. These arms are closed at their outer ends so that there is no communication with the interior of the water compartment.

E is a lamp, the drum or chimney *e* of which extends up directly under the inlet of the T-shaped pipe D.

The operation is as follows:—The milk is placed in the chamber A and water is supplied to compartment B. The lamp E is lighted and the heated gases and products of combustion rising therefrom enter the T-shaped pipe D, and spreading out therein are thus carried well into the mass of water in the compartment D. The T-shaped pipe being closed there is no escape for the heated gases and products of combustion as is the case where an ordinary flue passes through the body of water as in the boiler. In such a case only a portion of the heat is radiated while a great portion escapes through the flue into the stack. In my heater these gases and products of combustion are all confined within the T-shaped pipe, and must part with their heat which is thus given up to the water, the temperature of which is thereby raised. In this way but a small amount of heat is required, and this is readily furnished by means of an ordinary lamp, such as every family can use; and this heat it will be seen can be easily regulated to the required degree by properly manipulating the lamp. The arms of the T-shaped pipe D extending well out into the body of water in compartment B heat said body evenly, and thereby quickly raise its temperature. The T-shaped pipe is in fact a storage receptacle for the heat which as it parts with its heat into the surrounding body of water, has its supply constantly renewed by the uprising fresh gases and products of combustion from the burning wick. Thus the cost of heating is reduced to a minimum and is fully under the control of the operator as the lamp can be easily regulated.

Having thus described my invention, what I claim as new, and desire to secure by Letters Patent, is—

A cheese-making apparatus consisting of a vessel having in its upper portion a chamber for the milk, and in its lower portion a compartment for the water, a drain pipe from the milk chamber, a drain pipe from the water compartment and an inlet pipe in said compartment, the horizontally disposed T-shaped heating pipe confined between the top and bottom walls of the water compartment having its leg opening through the bottom of the water compartment and its horizontal arms having closed outer ends and extending into the body of water in said compartment, a foundation supporting said vessel and a lamp on said foundation in communication with the open leg of the heating pipe, substantially as herein described.

In witness whereof I have hereunto set my hand.

WILLIAM T. ARMSTRONG.

Witnesses:
H. N. STOCKTON,
L. M. NORRIS.